(12) United States Patent
Fecant et al.

(10) Patent No.: US 8,361,435 B2
(45) Date of Patent: Jan. 29, 2013

(54) IZM-2 CRYSTALLINE SOLID AND PROCESS FOR ITS PREPARATION

(75) Inventors: Antoine Fecant, Brignais (FR); Nicolas Bats, Feyzin (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 442 days.

(21) Appl. No.: 12/667,111

(22) PCT Filed: May 14, 2008

(86) PCT No.: PCT/FR2008/000675
§ 371 (c)(1),
(2), (4) Date: Jun. 18, 2010

(87) PCT Pub. No.: WO2009/004131
PCT Pub. Date: Jan. 8, 2009

(65) Prior Publication Data
US 2010/0272624 A1    Oct. 28, 2010

(30) Foreign Application Priority Data
Jun. 29, 2007    (FR) ...................................... 07 04704

(51) Int. Cl.
*C01B 39/46* (2006.01)
*C01B 39/48* (2006.01)
(52) U.S. Cl. ........................... 423/706; 423/718; 502/60

(58) Field of Classification Search .................. 423/706, 423/718; 502/60
See application file for complete search history.

(56) References Cited

U.S. PATENT DOCUMENTS

| | | | | |
|---|---|---|---|---|
| 4,397,827 A * | 8/1983 | Chu | ............................... | 423/705 |
| 4,539,193 A * | 9/1985 | Valyocsik | ...................... | 423/708 |
| 5,453,511 A * | 9/1995 | Saxton | .......................... | 546/191 |
| 5,968,473 A * | 10/1999 | Valencia et al. | ............... | 423/702 |
| 6,306,364 B1 * | 10/2001 | Valencia et al. | ............... | 423/713 |
| 2006/0210472 A1 * | 9/2006 | Hastoy et al. | ................. | 423/705 |
| 2011/0038789 A1 * | 2/2011 | Lai et al. | ......................... | 423/718 |
| 2011/0166402 A1 * | 7/2011 | Roth et al. | ..................... | 585/422 |

FOREIGN PATENT DOCUMENTS
EP          1 702 888 A     9/2006

* cited by examiner

*Primary Examiner* — David M Brunsman
(74) *Attorney, Agent, or Firm* — Millen, White, Zelano & Branigan, P.C.

(57) ABSTRACT

The invention concerns a crystalline solid designated IZM-2, which has the X ray diffraction diagram given below. Said solid has a chemical composition expressed as the anhydrous base in terms of moles of oxides by the formula $XO_2:aY_2O_3:bM_{2/n}O$, in which X represents at least one tetravalent element, Y represents at least one trivalent element and M is at least one alkali metal and/or an alkaline-earth metal with valency n, a and b respectively representing the number of moles of $Y_2O_3$ and $M_{2/n}O$; a is in the range 0 to 0.5 and b is in the range 0 to 1.

14 Claims, 1 Drawing Sheet

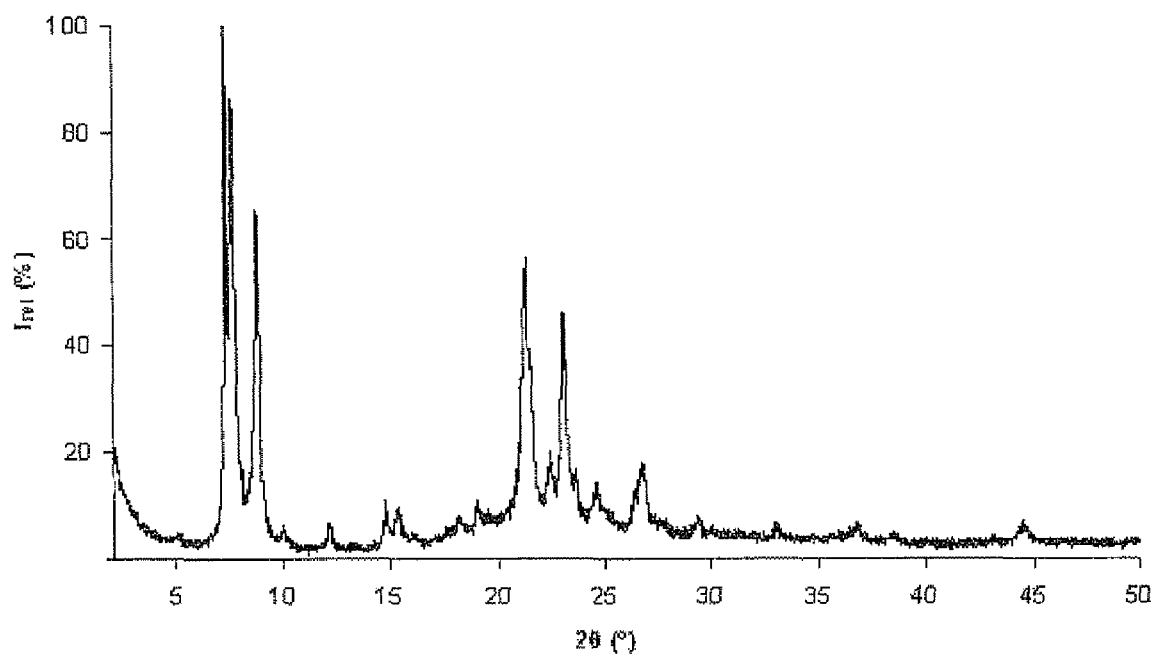

IZM-2 CRYSTALLINE SOLID AND PROCESS FOR ITS PREPARATION

TECHNICAL FIELD

The present invention relates to a novel microporous crystalline solid hereinafter termed IZM-2, to a process for preparing said solid and to the use of said solid as an adsorbant or separation agent.

PRIOR ART

Microporous crystalline materials such as zeolites or silicoaluminophosphates are solids which are widely used in the oil industry as catalysts, catalyst supports, adsorbants or separation agents. Although many microporous crystalline structures have been discovered, the refining and petrochemicals industry is constantly researching novel zeolitic structures which have particular properties for applications such as purification or separation of gas, or the conversion of carbonaceous or other species.

Microporous aluminosilicates are generally prepared from an aqueous reaction mixture containing alkali or alkaline-earth cations, organic species such as amines or quaternary ammonium compounds, metal oxides, silicon and aluminium.

DESCRIPTION OF THE INVENTION

The present invention concerns a novel crystalline solid termed an IZM-2 crystalline solid, having a novel crystalline structure. Said solid has a chemical composition, expressed as the anhydrous base in terms of moles of oxides defined by the following general formula: $XO_2:aY_2O_3:bM_{2/n}O$, in which X represents at least one tetravalent element, Y represents at least one trivalent element and M is at least one alkali metal and/or an alkaline-earth metal with valency n, a and b respectively representing the number of moles of $Y_2O_3$ and $M_{2/n}O$; a is in the range 0 to 0.5 and b is in the range 0 to 1.

The IZM-2 crystalline solid of the invention has an X ray diffraction diagram which includes at least the peaks set out in Table 1. This novel IZM-2 crystalline solid has a novel crystalline structure.

This diffraction diagram is obtained by radiocrystallographic analysis using a diffractometer employing the conventional powder technique with the K$\alpha$1 peak of copper ($\lambda$=1.5406 Å). From the position of the diffraction peaks represented by the angle 2$\theta$, the characteristic interplanar spacings $d_{hkl}$ of the sample are calculated using the Bragg relationship. The error estimation in the measurement $\Delta(d_{hkl})$ of $d_{hkl}$ is calculated by the Bragg relationship as a function of the absolute error $\Delta(2\theta)$ in the measurement of 2$\theta$. An absolute error $\Delta(2\theta)$ of ±0.02° is normally acceptable. The relative intensity $I_{rel}$ in each value of $d_{hkl}$ is measured from the height of the corresponding diffraction peak. The X ray diffraction diagram of the IZM-2 crystalline solid of the invention comprises at least the peaks at values of $d_{hkl}$ given in Table 1. In the $d_{hkl}$ column, the mean values of the interplanar spacings are shown in Angstroms (Å). Each of these values must be supplemented with an error measurement $\Delta(d_{hkl})$ between ±0.6 Å and ±0.01 Å.

TABLE 1

Mean values of $d_{hkl}$ and relative intensities measured on an X ray diffraction diagram of the calcined IZM-2 crystalline solid of the invention

| 2 theta (°) | $d_{hkl}$ (Å) | $I_{rel}$ |
|---|---|---|
| 5.07 | 17.43 | Vw |
| 7.36 | 12.01 | Vs |
| 7.67 | 11.52 | Vs |
| 8.78 | 10.07 | S |
| 10.02 | 8.82 | Vw |
| 12.13 | 7.29 | Vw |
| 14.76 | 6.00 | Vw |
| 15.31 | 5.78 | Vw |
| 15.62 | 5.67 | Vw |
| 16.03 | 5.52 | Vw |
| 17.60 | 5.03 | Vw |
| 18.22 | 4.87 | Vw |
| 19.01 | 4.66 | Vw |
| 19.52 | 4.54 | Vw |
| 21.29 | 4.17 | M |
| 22.44 | 3.96 | W |
| 23.10 | 3.85 | Mw |
| 23.57 | 3.77 | W |
| 24.65 | 3.61 | Vw |
| 26.78 | 3.33 | W |
| 29.33 | 3.04 | Vw |
| 33.06 | 2.71 | Vw |
| 36.82 | 2.44 | Vw |
| 44.54 | 2.03 | Vw | in which:
Vs = very strong;
S = strong;
M = medium;
Mw = medium weak;
W = weak;
Vw = very weak.

The relative intensity $I_{rel}$ is given with respect to a relative intensity scale where a value of 100 is attributed to the most intense peak in the X ray diffraction diagram: Vw<15; 15≦W<30; 30≦Mw<50; 50≦M<65; 65≦S<85; Vs≧85.

BRIEF DESCRIPTION OF THE DRAWING

The IZM-2 crystalline solid of the invention has a novel basic crystalline structure or topology which is characterized by its X ray diffraction diagram in the calcined form given in FIG. 1.

Said IZM-2 solid has a chemical composition expressed as the anhydrous base in terms of moles of oxides defined by the following general formula: $XO_2:aY_2O_3:bM_{2/n}O$, in which X represents at least one tetravalent element, Y represents at least one trivalent element and M is at least one alkali metal and/or an alkaline-earth metal with valency n. In said formula as given above, a represents the number of moles of $Y_2O_3$ and is in the range 0 to 0.5, more preferably in the range 0 to 0.05 and still more preferably in the range 0.0016 to 0.02, and b represents the number of moles of $M_{2/n}O$ and is in the range 0 to 1, more preferably in the range 0 to 0.5 and still more preferably in the range 0.005 to 0.5.

In accordance with the invention, X is preferably selected from silicon, germanium, titanium and a mixture of at least two of these tetravalent elements; more preferably, X is silicon and Y is preferably selected from aluminium, boron, iron, indium and gallium; more preferably, Y is aluminium. M is preferably selected from lithium, sodium, potassium, calcium, magnesium and a mixture of at least two of said metals; more preferably, M is sodium. Preferably, X represents silicon, and the IZM-2 crystalline solid of the invention is then an entirely siliceous solid when the element Y is absent from the composition of said solid IZM-2. It is also advantageous to use, as the element X, a mixture of several elements X, in particular a mixture of silicon with another element X selected from germanium and titanium, preferably germanium. Thus, when silicon is present as a mixture with another element X, the IZM-2 crystalline solid of the invention is then a crystalline metallosilicate having an X ray diffraction diagram identical to that described in Table 1 when it is in its calcined form. More preferably again, and in the presence of an element Y, X is silicon and Y is aluminium: the IZM-2 crystalline solid of the invention is then a crystalline aluminosilicate having an X ray diffraction diagram identical to that described in Table 1 when it is in its calcined form.

More generally, said IZM-2 solid of the invention has a chemical composition expressed by the following general formula: $XO_2:aY_2O_3:bM_{2/n}O:cR; dH_2O$, in which R represents an organic species comprising two quaternary nitrogen atoms, X represents at least one tetravalent element, Y represents at least one trivalent element and M is an alkali metal and/or an alkaline-earth metal with valency n; a, b, c and d respectively represent the number of moles of $Y_2O_3$, $M_{2/n}O$, R and $H_2O$ and a is in the range 0 to 0.5, b is in the range 0 to 1, c is in the range 0 to 2 and d is in the range 0 to 2. This formula and the values taken by a, b, c and d are those for which said IZM-2 solid is preferentially in its calcined form.

More precisely, said solid IZM-2 in its as-synthesized form has a chemical composition expressed by the following chemical formula: $XO_2:aY_2O_3:bM_{2/n}O:cR; dH_2O$ (I), in which R represents an organic species comprising two quaternary nitrogen atoms, X represents at least one tetravalent element, Y represents at least one trivalent element and M is an alkali metal and/or an alkaline-earth metal with valency n; a, b, c and d respectively represent the number of moles of $Y_2O_3$, $M_{2/n}O$, R and $H_2O$ and a is in the range 0 to 0.5, b is in the range 0 to 1, c is in the range 0.005 to 2 and preferably in the range 0.01 to 0.5, and d is in the range 0.005 to 2, preferably in the range 0.01 to 1.

In formula (I) given above to define the chemical composition of the IZM-2 crystalline solid in its as-synthesized form, the value of a is in the range 0 to 0.5, more preferably in the range 0 to 0.05 and still more preferably in the range 0.0016 to 0.02. Preferably, b is in the range 0 to 1; more preferably, b is in the range 0 to 0.5 and still more preferably b is in the range 0.005 to 0.5. The value of c is in the range 0.005 to 2, advantageously in the range 0.01 to 0.5. The value taken by d is in the range 0.005 to 2, preferably in the range 0.01 to 1.

In its as-synthesized form, i.e. directly from synthesis and prior to any calcining step(s) which are well known to the skilled person, said IZM-2 solid comprises at least the organic species R having two quaternary nitrogen atoms as described below, or its decomposition products, or precursors thereof. In a preferred mode of the invention, in formula (I) above, the element R is 1,6-bis(methylpiperidinium)hexane the developed formula for which is given below. Said organic species R, which acts as a template, may be eliminated by conventional means which are known in the art, such as heat treatments and/or chemical treatments.

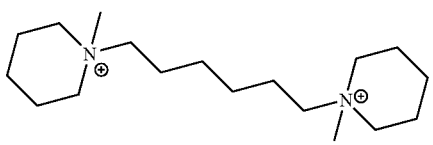 [SMILES: C[N+]1(CCCCCC[N+]2(C)CCCCC2)CCCCC1]

The IZM-2 crystalline solid of the invention is preferably a zeolitic solid.

The invention also concerns a process for preparing an IZM-2 crystalline solid in accordance with the invention in which the following are reacted: an aqueous mixture comprising at least one source of at least one oxide $XO_2$, optionally at least one source of at least one oxide $Y_2O_3$, optionally at least one source of at least one alkali and/or alkaline-earth metal with valency n, and at least one organic species R comprising two quaternary nitrogen atoms, the mixture preferably having the following molar composition:

| | |
|---|---|
| $XO_2/Y_2O_3$ | at least 2, preferably at least 20, more preferably 60 to 600; |
| $H_2O/XO_2$ | 1 to 100, preferably 10 to 70; |
| $R/XO_2$ | 0.02 to 2, preferably 0.05 to 0.5; |
| $M_{2/n}O/XO_2$ | 0 to 1, preferably 0.005 to 0.5. | where X is one or more tetravalent element(s) selected from the group formed by the following elements: silicon, germanium and titanium, preferably silicon, where Y is one or more trivalent element(s) selected from the group formed by the following elements: aluminium, iron, boron, indium and gallium, preferably aluminium, and where M is one or more alkali and/or alkaline-earth metal(s) selected from lithium, sodium, potassium, calcium, magnesium and a mixture of at least two of these metals, preferably sodium.

In accordance with the process of the invention, R is an organic species having two quaternary nitrogen atoms acting as an organic template. Preferably, R is the nitrogen-containing compound 1,6-bis(methylpiperidinium)hexane. The anions associated with the quaternary ammonium cations present in the organic species template for the synthesis of the IZM-2 crystalline solid of the invention are selected from the acetate anion, the sulphate anion, the carboxylate anion, the tetrafluoroborate anion, halide anions such as the fluoride, the chloride, the bromide, the iodide, the hydroxide anion and a combination of several of these. Preferably, the anions associated with the quaternary ammonium cations present in the template species for synthesis of the IZM-2 crystalline solid are selected from the hydroxide anion and the bromide anion. Said organic nitrogen-containing species used as the template for the IZM-2 crystalline solid is synthesized using any method which is known to the skilled person. For the synthesis of the 1,6-bis(methylpiperidinium)hexane dibromide, one mole of 1,6-dibromohexane is mixed with at least 2 moles of N-methylpiperidine in ethanol. Generally, the mixture is heated under reflux for a period in the range 3 to 10 hours. After filtration, precipitation using an etherified solvent such as diethylether then re-crystallization from an ethanol/ether mixture, 1,6-bis(methylpiperidinium)hexane dibromide is obtained. The 1,6-bis(methylpiperidinium)hexane dihydroxide is preferably obtained by treatment at ambient temperature of an aqueous solution of the 1,6-bis(methylpiperidinium)hexane dibromide using silver oxide, $Ag_2O$.

The source of the element X employed to carry out the process for preparing solid crystalline IZM-2 may be any compound comprising the element X and which can liberate that element in aqueous solution in the reactive form. Advantageously, when the element X is silicon, the silica source may be any one of those currently used in synthesizing zeolites, for example solid powdered silica, silicic acid, colloidal silica, dissolved silica or tetraethoxysilane (TEOS). Of the powdered silicas, it is possible to use precipitated silicas, in particular those obtained by precipitation from a solution of an alkali metal silicate, such as aerosol silicas, pyrogenic silicas, for example "CAB-O-SIL", and silica gels. It is possible to use colloidal silicas having different particle sizes, for example with a mean equivalent diameter in the range 10 to 15 nm or between 40 and 50 nm, such as those sold under trade names such as "LUDOX". Preferably, the silicon source is LUDOX-AS-40.

The source of element Y which may optionally be used to carry out the process for preparation of the IZM-2 crystalline solid may be any compound comprising the element Y which can liberate that element in aqueous solution in the reactive form. In the preferred case in which Y is aluminium, the source of alumina is preferably sodium aluminate, or an aluminium salt, for example the chloride, nitrate, hydroxide or sulphate, an aluminium alkoxide or alumina proper, preferably in the hydrated or hydratable form, such as colloidal alumina, pseudoboehmite, gamma alumina or alpha or beta trihydrate. It is also possible to use mixtures of the sources cited above.

The source of the alkali and/or alkaline-earth metal M with valency n is advantageously a halide or a hydroxide of said metal M, preferably a hydroxide of said metal M.

In order to carry out the process for preparing the IZM-2 solid of the invention, it is preferable that the aqueous mixture comprising at least one source of at least one oxide $XO_2$, optionally at least one source of at least one oxide $Y_2O_3$, optionally at least one source of at least one alkali and/or alkaline-earth metal with valency n, at least one organic species R containing two quaternary nitrogen atoms, also comprises at least one source of hydroxide ions. Said source of hydroxide ions advantageously derives from the organic template species R when it is in the hydroxide form, namely the 1,6-bis(methylpiperidinium)hexane dihydroxide, or a source of alkali metal and/or alkaline-earth metal M when it is in the hydroxide form, for example sodium hydroxide.

Additionally, in accordance with a preferred implementation of the process of the invention, an aqueous mixture comprising an oxide of silicon, optionally alumina, 1,6-bis (methylpiperidinium)hexane dibromide and sodium hydroxide is reacted. In accordance with another preferred implementation of the process of the invention, an aqueous mixture comprising an oxide of silicon, optionally alumina and 1,6-bis(methylpiperidinium)hexane dihydroxide is reacted.

The process of the invention consists of preparing an aqueous reaction mixture known as a gel and comprising at least one source of at least one oxide $XO_2$, optionally at least one source of at least one oxide $Y_2O_3$, at least one organic species R, and optionally at least one source of at least one alkali and/or alkaline-earth metal with valency n. The quantities of said reagents are adjusted so as to provide said gel with a composition allowing it to crystallize into the IZM-2 crystalline solid in the as-synthesized faun with general formula (I) $XO_2:aY_2O_3:bM_{2/n}O; cR; dH_2O$, where a, b, c and d satisfy the criteria defined above when c and d are greater than 0. Next, the gel undergoes a hydrothermal treatment until the IZM-2 crystalline solid forms. The gel is advantageously subjected to hydrothermal conditions under autogenous reaction pressure, optionally by adding gas, for example nitrogen, at a temperature in the range 120° C. to 200° C., preferably in the range 140° C. to 180° C., and more preferably in the range 160° C. to 175° C. until solid IZM-2 crystals in accordance with the invention are formed in the as-synthesized form. The time necessary to obtain crystallization generally varies between 1 hour and several months depending on the composition of the reagents in the gel, stirring and the reaction temperature. Preferably, the crystallization period is in the range 2 hours to 21 days. The reaction is generally carried out with stirring or in the absence of stirring, preferably in the presence of stirring.

It may be advantageous to add seeds to the reaction mixture to reduce the time necessary for the formation of crystals and/or to reduce the total crystallization period. It may also be advantageous to use seeds to encourage the formation of IZM-2 crystalline solid, to the detriment of impurities. Such seeds comprise solid crystals, preferably crystals of solid IZM-2. The crystalline seeds are generally added in a proportion in the range 0.01% to 10% by weight of oxide $XO_2$ used in the reaction mixture.

At the end of the hydrothermal treatment step resulting in crystallization of the IZM-2 solid, the solid phase is filtered, washed, dried then calcined. The calcining step is advantageously implemented by means of one or more heating steps carried out at a temperature in the range 100° C. to 1000° C., preferably in the range 400° C. to 650° C., for a period in the range from a few hours to several days, preferably in the range 3 hours to 48 hours. Preferably, calcining is carried out in two consecutive heating steps.

At the end of said calcining step, the IZM-2 solid obtained is that with an X ray diffraction diagram including at least the peaks set out in Table 1. It is free of water and of the organic species R present in the solid IZM-2 in the as-synthesized form.

The present invention also concerns the use of the IZM-2 solid of the invention as an adsorbant to control pollution or as a molecular sieve for separation.

Thus, the present invention also pertains to an adsorbant comprising the IZM-2 crystalline solid of the invention. When it is used as an adsorbant, the IZM-2 crystalline solid of the invention is generally dispersed in an inorganic matrix phase which contains channels and cavities which allow the fluid to be separated to access the crystalline solid. These matrices are preferably mineral oxides, for example silicas, aluminas, silica-aluminas or clays. The matrix generally represents 2% to 25% of the mass of the adsorbant thus formed.

The invention is illustrated in the following examples which are not in any way limiting in nature.

EXAMPLE 1

Preparation of 1,6-bis(methylpiperidinium)hexane dibromide (Template A)

50 g of 1,6-dibromohexane (0.20 mole, 99%, Alfa Aesar) was added to a 1 L flask containing 50 g of N-methylpiperidine (0.51 mole, 99%, Alfa Aesar) and 200 mL of ethanol. The reaction medium was stirred and heated under reflux for 5 h. The mixture was then cooled to ambient temperature and filtered. The mixture was poured into 300 mL of cold diethylether, then the precipitate formed was filtered and washed with 100 mL of diethylether. The solid obtained was re-crystallized from an ethanol/ether mixture. The solid obtained was vacuum dried for 12 h. 71 g of a white solid was obtained (i.e. a yield of 80%).

The product had the expected $^1$H NMR spectrum. $^1$H NMR ($D_2O$, ppm/TMS): 1.27 (4H, m); 1.48 (4H, m); 1.61 (4H, m); 1.70 (8H, m); 2.85 (6H, s); 3.16 (12H, m).

EXAMPLE 2

Preparation of 1,6-bis(methylpiperidinium)hexane dihydroxide (Template B)

18.9 g of $Ag_2O$ (0.08 mole, 99%, Aldrich) was added to a 250 mL Teflon beaker containing 30 g of template A (0.07 mole) and 100 mL of deionized water. The reaction medium was stirred, protected from light, for 12 h. The mixture was then filtered. The filtrate obtained was composed of an aqueous solution of 1,6-bis(methylpiperidinium)hexane dihydroxide. This species was assayed by proton NMR using formic acid as the standard.

EXAMPLE 3

Preparation of an IZM-2 Solid in Accordance with the Invention 20.161 g of a colloidal suspension of silica, known under the trade name Ludox AS-40 sold by Aldrich, was incorporated into a solution composed of 1.685 g of sodium hydroxide (Prolabo), 9.901 g of template A and 68.252 g of deionized water. The molar composition of the mixture was as follows: $SiO_2$; $0.17 Na_2O$; $0.17$ A; $33.33$ $H_2O$. The mixture was stirred vigorously for half an hour. Following homogenization, the mixture was transferred into an autoclave. The autoclave was heated for 1 day at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2 is shown in FIG. 1.

EXAMPLE 4

Preparation of an IZM-2 Solid in Accordance with the Invention 20.150 g of a colloidal suspension of silica, known under the trade name Ludox AS-40 sold by Aldrich, was incorporated into a solution composed of 0.106 g of sodium aluminate (Carlo erba), 1.634 g of sodium hydroxide (Prolabo), 9.896 g of template A and 68.215 g of deionized water. The molar composition of the mixture was as follows: $SiO_2$; $0.004$ $Al_2O_3$; $0.17$ $Na_2O$; $0.17$ A; $33.33$ $H_2O$. The mixture was stirred vigorously for half an hour. Following homogenization, the mixture was transferred into an autoclave. The autoclave was heated for 6 hours at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2 is shown in FIG. 1.

EXAMPLE 5

Preparation of an IZM-2 solid in accordance with the invention 20.115 g of a colloidal suspension of silica, known under the trade name Ludox AS-40 sold by Aldrich, was incorporated into a solution composed of 0.422 g of sodium aluminate (Carlo erba), 1.48 g of sodium hydroxide (Prolabo), 9.879 g of compound A and 68.104 g of deionized water. The molar composition of the mixture was as follows: $SiO_2$; $0.017$ $Al_2O_3$; $0.17$ $Na_2O$; $0.17$ A; $33.33H_2O$. The mixture was stirred vigorously for half an hour. Following homogenization, the mixture was transferred into an autoclave. The autoclave was heated for 8 days at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2 is shown in FIG. 1.

EXAMPLE 6

Preparation of an IZM-2 Solid in Accordance with the Invention 21.048 g of a colloidal suspension of silica, known under the trade name Ludox AS-40 sold by Aldrich, was incorporated into a solution composed of 30.843 g of an aqueous solution of 23.96% by weight of template B and 48.109 g of deionized water. The molar composition of the mixture was as follows: $SiO_2$; $0.17$ B; $33.33$ $H_2O$. The mixture was stirred vigorously for half an hour. Following homogenization, the mixture was transferred into an autoclave. The autoclave was heated for 10 days at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2 is shown in FIG. 1.

EXAMPLE 7

Preparation of an IZM-2 Solid in Accordance with the Invention 21.035 g of a colloidal suspension of silica, known under the trade name Ludox AS-40 sold by Aldrich, was incorporated into a solution composed of 30.825 g of an aqueous solution of 23.96% by weight of template B, 0.091 g of aluminium hydroxide (Aldrich) and 48.049 g of deionized water. The molar composition of the mixture was as follows: $SiO_2$; $0.004$ $Al_2O_3$; $0.17$ B; $33.33$ $H_2O$. The mixture was stirred vigorously for half an hour. Following homogenization, the mixture was transferred into an autoclave. The autoclave was heated for 15 days at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2is shown in FIG. 1

EXAMPLE 8

Preparation of an IZM-2 Solid in Accordance with the Invention 20.998 g of a colloidal suspension of silica, known under the trade name Ludox AS-40 sold by Aldrich, was incorporated into a solution composed of 30.770 g of an aqueous solution of 23.96% by weight of template B, 0.364 g of aluminium hydroxide (Aldrich) and 47.868 g of deionized water. The molar composition of the mixture was as follows: $SiO_2$; 0.017 $Al_2O_3$; 0.17 B; 33.33 $H_2O$. The mixture was stirred vigorously for half an hour. Following homogenization, the mixture was transferred into an autoclave. The autoclave was heated for 21 days at 170° C. with stirring (200 rpm). The crystalline product obtained was filtered, washed with deionized water (to a neutral pH) then dried overnight at 100° C. The solid was introduced into a muffle furnace where calcining was carried out: the calcining cycle comprised a temperature ramp-up to 200° C., a stage at 200° C. for 2 hours, a temperature ramp-up to 550° C. followed by a stage at 550° C. for 8 hours, then a return to ambient temperature.

The solid calcined product was analyzed by X ray diffraction and identified as being constituted by solid IZM-2. The diffraction diagram for the calcined solid IZM-2 is shown in FIG. 1.

EXAMPLE 9

Preparation of an Adsorbant Comprising the IZM-2 Solid

The calcined solid of Example 3 was formed into extrudates by mixing with boebmite (Poral SB3, Sasol) in a Z arm mixer and extruding the paste obtained with a piston extruder. The extrudates were then dried at 120° C. for 12 h in air and calcined at 550° C. for 2 hours in a stream of air in a muffle furnace.

The adsorbant thus prepared was composed of 80% of the IZM-2 zeolitic solid and 20% of alumina.

The invention claimed is:

1. An IZM-2 crystalline solid with an X ray diffraction diagram including at least the peaks set out in the table below:

| 2 theta (°) | $d_{hkl}$ (Å) | $I_{rel}$ |
|---|---|---|
| 5.07 | 17.43 | Vw |
| 7.36 | 12.01 | Vs |
| 7.67 | 11.52 | Vs |
| 8.78 | 10.07 | S |
| 10.02 | 8.82 | Vw |
| 12.13 | 7.29 | Vw |
| 14.76 | 6.00 | Vw |
| 15.31 | 5.78 | Vw |
| 15.62 | 5.67 | Vw |
| 16.03 | 5.52 | Vw |
| 17.60 | 5.03 | Vw |
| 18.22 | 4.87 | Vw |
| 19.01 | 4.66 | Vw |
| 19.52 | 4.54 | Vw |
| 21.29 | 4.17 | M |
| 22.44 | 3.96 | W |
| 23.10 | 3.85 | Mw |
| 23.57 | 3.77 | W |
| 24.65 | 3.61 | Vw |
| 26.78 | 3.33 | W |
| 29.33 | 3.04 | Vw |
| 33.06 | 2.71 | Vw |
| 36.82 | 2.44 | Vw |
| 44.54 | 2.03 | Vw | in which: Vs=very strong; S=strong; M=medium; Mw=medium weak; W=weak; Vw=very weak, and having a chemical composition, expressed as the anhydrous base in terms of moles of oxides, defined by the following general formula: $XO_2:aY_2O_3:bM_{2/n}O$, in which X represents at least one tetravalent element, Y represents at least one trivalent element and M is at least one alkali metal and/or an alkaline-earth metal with valency n, a and b respectively representing the number of moles of $Y_2O_3$ and $M_{2/n}O$; a is in the range of 0 to 0.5 and b is in the range of 0 to 1.

2. An IZM-2 crystalline solid according to claim 1, in which X is silicon.

3. An IZM-2 crystalline solid according to claim 2, in which a is in the range of 0.0016 to 0.02 and b is in the range of 0.005 to 0.5.

4. An IZM-2 crystalline solid according to claim 2, in which a is in the range of 0.0016 to 0.02 and b is in the range of 0.005 to 0.5.

5. An IZM-2 crystalline solid according to claim 1, in which Y is aluminium.

6. An IZM-2 crystalline solid according to claim 5, in which Y is aluminium.

7. An IZM-2 crystalline solid according to claim 6, in which a is in the range of 0.0016 to 0.02 and b is in the range of 0.005 to 0.5.

8. A adsorbant, comprising of an IZM-2 crystalline solid according to claim 7.

9. An IZM-2 crystalline solid according to claim 1, in which a is in the range of 0.0016 to 0.02 and b is in the range of 0.005 to 0.5.

10. A process for preparing an IZM-2 crystalline solid according to claim 1, comprising mixing in an aqueous medium at least one source of at least one oxide $XO_2$, optionally at least one source of at least one oxide $Y_2O_3$, optionally at least one source of at least one alkali and/or alkaline-earth metal with valency n, and at least one organic species R comprising two quaternary nitrogen atoms, then carrying out hydrothermal treatment of said mixture until said IZM-2 crystalline solid forms, followed by filtration, washing, drying and calcining steps.

11. A process for preparing an IZM-2 crystalline solid according to claim 10, in which the molar composition of the reaction mixture is such that:

| | |
|---|---|
| $XO_2/Y_2O_3$ | at least 2; |
| $H_2O/XO_2$ | 1 to 100; |
| $R/XO_2$ | 0.02 to 2; |
| $M_{2/n}O/XO_2$ | 0 to 1. |

12. A process for preparing an IZM-2 crystalline solid according to claim 11, in which R is 1,6-bis(methylpiperidinium)hexane.

13. A process for preparing an IZM-2 crystalline solid according to claim 10, in which R is 1,6-bis(methylpiperidinium)hexane.

14. A adsorbant, comprising of an IZM-2 crystalline solid according to claim 1.

* * * * *

UNITED STATES PATENT AND TRADEMARK OFFICE
CERTIFICATE OF CORRECTION

PATENT NO. : 8,361,435 B2  Page 1 of 1
APPLICATION NO. : 12/667111
DATED : January 29, 2013
INVENTOR(S) : Fecant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 613 days.

Signed and Sealed this
First Day of September, 2015

Michelle K. Lee
*Director of the United States Patent and Trademark Office*